United States Patent
Ho et al.

(10) Patent No.: US 10,671,526 B2
(45) Date of Patent: Jun. 2, 2020

(54) ELECTRONIC COMPUTING DEVICE, METHOD FOR ADJUSTING THE TRIGGER MECHANISM OF A GARBAGE COLLECTION FUNCTION, AND NON-TRANSITORY COMPUTER READABLE STORAGE MEDIUM THEREOF

(71) Applicant: HTC CORPORATION, Taoyuan (TW)

(72) Inventors: Wen-Yuan Ho, Taoyuan (TW); Yi-Fan Zhang, Taoyuan (TW); Xiao-Ting Hong, Taoyuan (TW)

(73) Assignee: HTC CORPORATION, Taoyuan (TW)

(*) Notice: Subject to any disclaimer, the term of this patent is extended or adjusted under 35 U.S.C. 154(b) by 75 days.

(21) Appl. No.: 15/794,423

(22) Filed: Oct. 26, 2017

(65) Prior Publication Data

US 2018/0365144 A1 Dec. 20, 2018

(30) Foreign Application Priority Data

Jun. 16, 2017 (CN) .......................... 2017 1 0457210

(51) Int. Cl.
*G06F 12/02* (2006.01)
*G06F 3/06* (2006.01)
*G06F 9/455* (2018.01)

(52) U.S. Cl.
CPC ........ *G06F 12/0253* (2013.01); *G06F 3/0608* (2013.01); *G06F 3/0652* (2013.01);
(Continued)

(58) Field of Classification Search
CPC ............ G06F 12/0253; G06F 9/45558; G06F 3/0664; G06F 3/0673; G06F 3/0652;
(Continued)

(56) References Cited

U.S. PATENT DOCUMENTS 6,854,115 B1 * 2/2005 Traversat .............. G06F 11/203
711/113
9,619,170 B2 4/2017 Hashimoto et al.
(Continued)

FOREIGN PATENT DOCUMENTS

TW 201348955 A 12/2013
TW 201437802 A 10/2014

*Primary Examiner* — David Yi
*Assistant Examiner* — Alan Otto
(74) *Attorney, Agent, or Firm* — Cantor Colburn LLP

(57) ABSTRACT

An electronic computing device, a method for adjusting the trigger mechanism of a garbage collection function, and a non-transitory computer readable storage medium thereof are provided. A storage unit of the electronic computing device stores a whitelist. The whitelist records a plurality of data sets, wherein each of the data sets has a name of an application and an offset value of the application. A processor of the electronic computing device executes a system program. The system program loads the whitelist into a memory during a initialization procedure. The system program detects that a specific application is triggered and retrieves the offset value of the specific application from the whitelist in the memory according to the name of the specific application. The system program forks a process to the specific application and updates a threshold of a garbage collection function according to the offset value.

12 Claims, 2 Drawing Sheets

(52) U.S. Cl.
CPC .......... *G06F 3/0664* (2013.01); *G06F 3/0673* (2013.01); *G06F 9/45558* (2013.01); *G06F 2009/45583* (2013.01); *G06F 2212/1044* (2013.01); *G06F 2212/152* (2013.01)

(58) Field of Classification Search
CPC ......... G06F 3/0608; G06F 2009/45583; G06F 2212/152; G06F 2212/1044
See application file for complete search history.

(56) References Cited

U.S. PATENT DOCUMENTS

| | | | |
|---|---|---|---|
| 2009/0276478 A1* | 11/2009 | Soman | G06F 12/0276 |
| 2011/0107050 A1* | 5/2011 | Vengerov | G06F 12/0269 |
| | | | 711/170 |
| 2013/0326168 A1 | 12/2013 | Chang et al. | |
| 2016/0283366 A1* | 9/2016 | Nguyen Tien | G06F 12/0246 |

\* cited by examiner

ELECTRONIC COMPUTING DEVICE, METHOD FOR ADJUSTING THE TRIGGER MECHANISM OF A GARBAGE COLLECTION FUNCTION, AND NON-TRANSITORY COMPUTER READABLE STORAGE MEDIUM THEREOF

CROSS REFERENCE TO RELATED APPLICATION

The present invention claims priority under 35 U.S.C. § 119 to Chinese Patent Application No. 201710457210.7 filed Jun. 16, 2017, the entire content of which is incorporated herein by reference.

BACKGROUND OF THE INVENTION

Field of the Invention

The present invention relates to an electronic computing device, a method for adjusting the trigger mechanism of a garbage collection function, and a non-transitory computer readable storage medium thereof. More particularly, the present invention relates to an electronic computing device, a method, and a non-transitory computer readable storage medium thereof for adjusting the trigger mechanism of a garbage collection function in response to triggering of an application.

Descriptions of the Related Art

Many operating systems use virtual machines to control resource allocations of applications in operation. For example, in the Android operating system, the Java virtual machine, the Android RunTime (ART) virtual machine, and the Dalvik virtual machine have been developed.

The virtual machines used in such operating systems all have a parameter related to heap (e.g., the parameter "dalvik.vm.heapstartsize" used in the ART virtual machine and the Dalvik virtual machine), and this parameter specifies the size of a heap allocated to an application when the application is activated. In case the value of this parameter is changed, all applications controlled by the virtual machine will be affected. If this parameter is set to a smaller value, the garbage collection will be triggered easily. Conversely, if this parameter is set to a larger value, the random access memory (RAM) of the overall system will be consumed rapidly although the garbage collection will not be triggered easily.

Accordingly, there is an urgent need in the art for a technology that can improve performance of the application but will not consume the RAM of the overall system too rapidly.

SUMMARY OF THE INVENTION

An objective of the present invention is to provide an electronic computing device. The electronic computing device comprises a storage unit, a memory, and a processor electronically connected to the storage unit and the memory. The storage unit is configured to store a whitelist. The whitelist records a plurality of data sets, and each of the data sets has a name of an application and an offset value of the application. The processor executes a system program, and the system program loads the whitelist into the memory during an initialization procedure. The system program detects that a specific application is triggered and retrieves the offset value corresponding to the specific application from the whitelist stored in the memory according to a name of the specific application. Additionally, the system program forks a process to the specific application and updates a threshold value for triggering a garbage collection function according to the offset value.

Another objective of the present invention is to provide a method for adjusting trigger mechanism of a garbage collection function, which is applicable to an electronic computing device. The electronic computing device comprises a storage unit, a memory, and a processor. The storage unit stores a whitelist. The whitelist records a plurality of data sets, wherein each of the data sets has a name of an application and an offset value of the application. The method comprises the following steps of: (a) executing a system program by the processor; (b) loading, by the system program, the whitelist into the memory during an initialization procedure; (c) detecting, by the system program, that a specific application is triggered; (d) retrieving, by the system program, the offset value corresponding to the specific application from the whitelist stored in the memory according to a name of the specific application; (e) forking, by the system program, a process to the specific application; and (f) updating, by the system program, a threshold value for triggering the garbage collection function according to the offset value.

Yet another objective of the present invention is to provide a non-transitory computer readable storage medium, which has a computer program stored therein. The computer program executes a method for adjusting trigger mechanism of a garbage collection function after being loaded into an electronic computing device. The electronic computing device comprises a storage unit, a memory, and a processor. The storage unit stores a whitelist. The whitelist records a plurality of data sets, wherein each of the data sets has a name of an application and an offset value of the application. The method comprises the following steps of: (a) executing a system program by the processor; (b) loading, by the system program, the whitelist into the memory during an initialization procedure; (c) detecting, by the system program, that a specific application is triggered; (d) retrieving, by the system program, the offset value corresponding to the specific application from the whitelist stored in the memory according to a name of the specific application; (e) forking, by the system program, a process to the specific application; and (f) updating, by the system program, the threshold value for triggering the garbage collection function according to the offset value.

According to the technology of the present invention, the system program executed in the electronic computing device uses a whitelist, wherein the whitelist records an offset value (i.e., an amount/value for updating a threshold for triggering the garbage collection function) of each application. Each time an application is triggered, the system program determines whether an offset value of the application is contained in the whitelist. If the offset value of the application is contained in the whitelist, the system program updates the threshold value for triggering the garbage collection function accordingly. Since the threshold value for triggering the garbage collection function is dynamically updated by the system program, the probability of triggering the garbage collection function is decreased, the timing of triggering the garbage collection function is postponed, and the execution performance of the application is improved.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the electronic computing device, the method for adjusting the trigger mechanism of a garbage collection function, and a non-transitory computer readable storage medium thereof according to the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
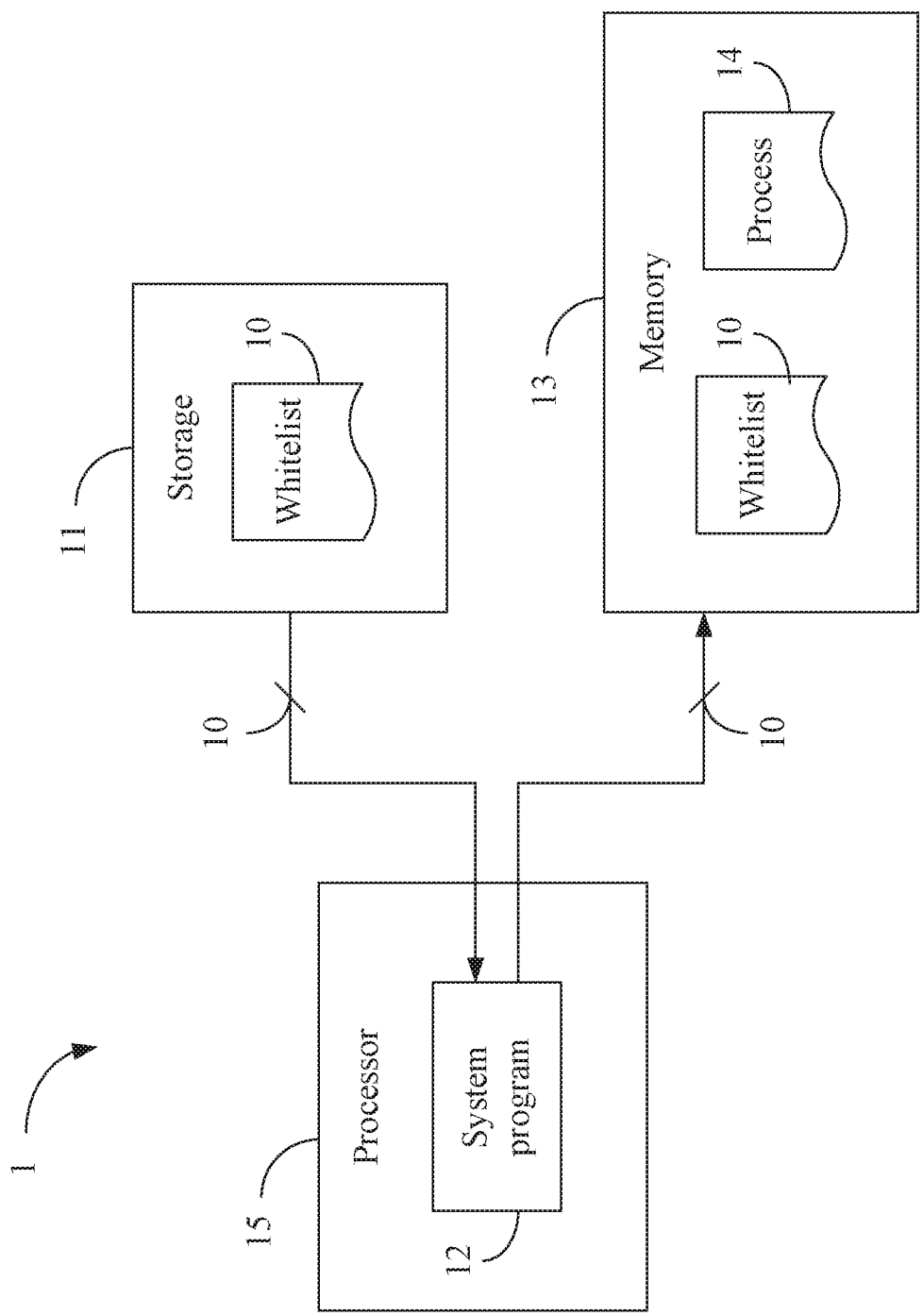
FIG. 1 is a schematic view of an electronic computing device 1 according to a first embodiment of the present invention.

A first embodiment of the present invention is an electronic computing device 1, whose schematic structure is depicted in FIG. 1. The electronic computing device 1 comprises a storage unit 11, a memory 13, and a processor 15 electrically connected to the storage unit 11 and the memory 13. The electronic computing device 1 may be a desktop computer, a notebook computer, a handheld electronic device, a smartphone, a tablet computer, or some other similar device. The storage unit 11 may be a mobile disk, a Universal Serial Bus (USB) disk, a hard disk, a compact disk (CD), or any other storage media with the same function and well known to those skilled in the art. The memory 13 may be a Random Access Memory (RAM). The processor 15 may be a Central Processing Unit (CPU), a microprocessor, or any other computing device well known to those of ordinary skill in the art.

In this embodiment, the storage unit 11 stores a whitelist 10. The whitelist 10 records a plurality of data sets (not shown), wherein each of the data sets comprises a name (not shown) of an application and an offset value (not shown) of the application. When the electronic computing device 1 is powered on, a system program 12 is executed by the processor 15. The system program 12 may be viewed as a virtual machine, which is used to control resource allocations of applications running in the electronic computing device 1. For example, the system program 12 may be a Java virtual machine, an Android RunTime (ART) virtual machine, or a Dalvik virtual machine. In this embodiment, the system program 12 loads the whitelist 10 from the storage unit 10 into the memory 13 during an initialization procedure of the system program 12. In this embodiment, a threshold value (not shown) is used by the system program 12 to trigger a garbage collection function. Specifically, the garbage collection function is triggered by the system program 12 when a heap usage amount of the electronic computing device 1 is greater than the threshold value.

Here, it is assumed that triggering of a certain application (not shown) is detected by the system program 12 at a certain time point (e.g., a click on an icon representing this application is detected). For convenience, the triggered application is called a "specific application". In response to the triggering of the specific application, the system program 12 determines whether data of the specific application is contained in the whitelist 10 of the memory 13 according to a name of the specific application. Specifically, the system program 12 determines whether the name of the specific application is consistent with any one of the names of the applications recorded in the whitelist 10.

If there is a name consistent with the name of the specific application (i.e., if the whitelist 10 in the memory 13 contains the data of the specific application), the system program 12 retrieves the offset value corresponding to the specific application from the whitelist 10 of the memory 13. Next, the system program 12 forks a process 14 to the specific application and updates the threshold value for triggering the garbage collection function according to the offset value corresponding to the specific application. For example, the system program 12 may update the threshold value by adding the offset value to the threshold value. If the system program 12 determines that the whitelist 10 of the memory 13 does not contain the data of the specific application, the system program 12 directly forks the process 14 to the specific application without updating the threshold value for triggering the garbage collection function.

It shall be appreciated that, in this embodiment, each time the system program 12 is to allocate a heap to the specific application or other applications, the system program 12 calculates an estimated heap usage amount (i.e., a heap to be allocated plus the used heap amount) and determines whether the estimated heap usage amount is greater than the threshold value. If the estimated heap usage amount is greater than the threshold value, the system program 12 executes the garbage collection function.

According to the above description, the system program 12 executed in the electronic computing device 1 uses a whitelist 10, wherein the whitelist 10 records an offset value (i.e., an amount/value for updating a threshold for triggering the garbage collection) of each application. Each time an application is triggered, the system program 12 determines whether an offset value of the application is contained in the whitelist 10. If it is contained in the whitelist 10, the system program 12 updates the threshold value for triggering the garbage collection function accordingly. Since the threshold value for triggering the garbage collection function is dynamically updated by the system program 12, the probability of triggering the garbage collection function is decreased, the timing of triggering the garbage collection function is postponed, and the execution performance of the application is improved.

Figure 2:
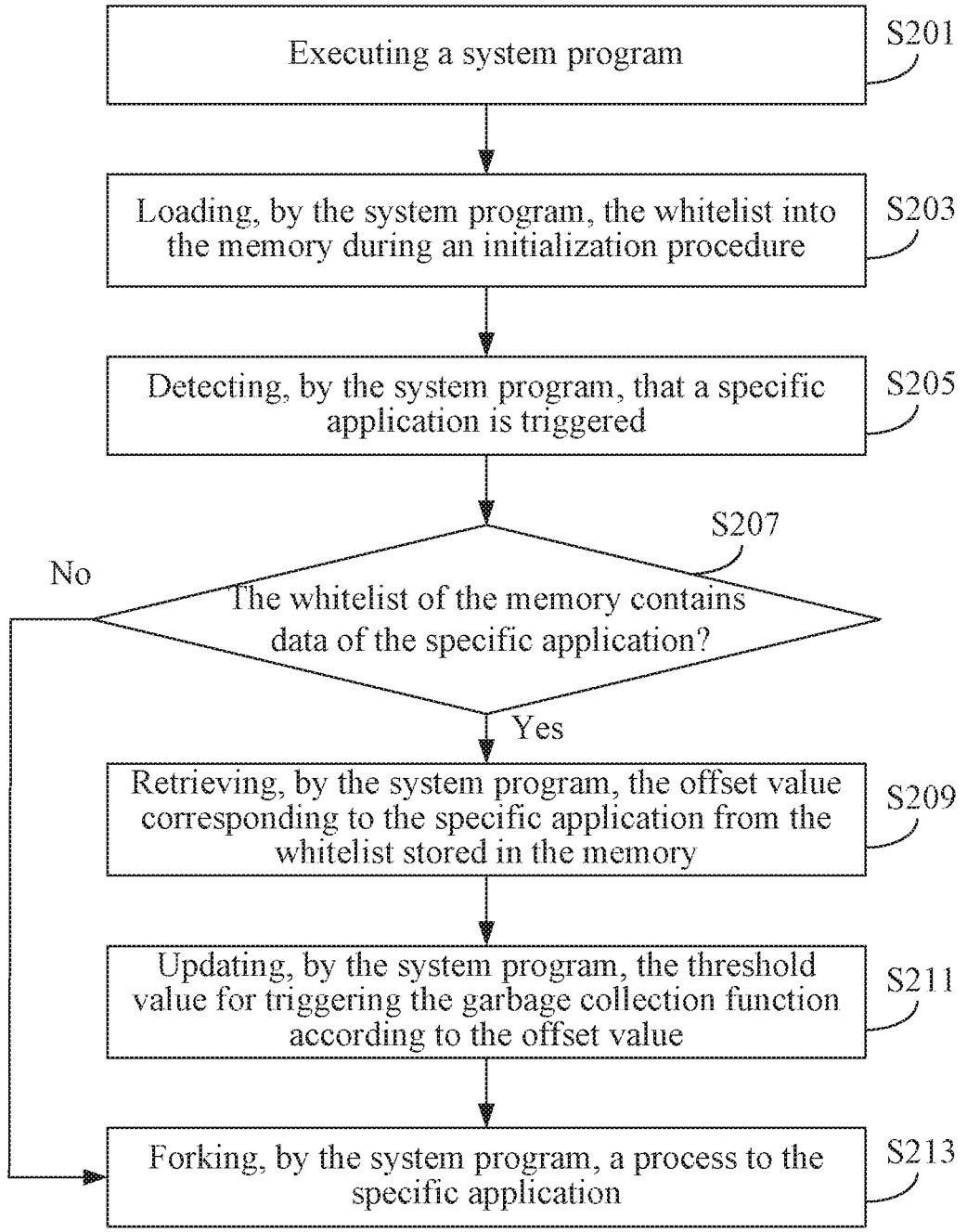
FIG. 2 is a flowchart diagram according to a second embodiment of the present invention.

A second embodiment of the present invention is a method for adjusting the triggering mechanism of a garbage collection function, whose flowchart is depicted in FIG. 2. The method is applicable to an electronic computing device (e.g., the electronic computing device 1 described in the first embodiment). The electronic computing device comprises a storage unit, a memory, and a processor. The storage unit stores a whitelist. The whitelist records a plurality of data sets, wherein each of the data sets has a name of an application and an offset value of the application.

In step S201, a system program is executed by the processor. The system program may be viewed as a virtual machine which is used to control resource allocations of applications running in the electronic computing device. For example, the system program may be a Java virtual machine, an Android RunTime (ART) virtual machine, or a Dalvik virtual machine. In step S203, the whitelist is loaded into the memory during an initialization procedure by the system program. In step S205, the system program detects that a specific application is triggered (e.g., a click on an icon representing the application is detected). For convience, the triggered application is called a "specific application".

In step S207, the system program determines whether the whitelist stored in the memory contains data of the specific application. If the determination result in the step S207 is yes, step S209 is executed by the system program for retrieving the offset value corresponding to the specific application from the whitelist stored in the memory according to a name of the specific application. Next in step S211, a threshold value for triggering the garbage collection function is updated by the system program according to the offset value. In step S213, the system program forks a process to the specific application. If the determination result in the step S207 is no, the method proceeds to the step S213 directly.

It shall be appreciated that, in this embodiment, each time the system program is to allocate a heap to the specific application or other applications, the method executes a step (not shown) for calculating, by the system program, an estimated heap usage amount (i.e., a heap to be allocated plus the used heap amount) and then executes another step (not shown) for determining whether the estimated heap usage amount is greater than the threshold value. If the estimated heap usage amount is greater than the threshold value, the method executes a further step for performing, by the system program, the garbage collection function.

In addition to the aforesaid steps, the second embodiment can also execute all the operations and steps, have the same functions, and deliver the same technical effect set forth in the first embodiment. How the second embodiment executes these operations and steps, have the same functions, and deliver the same technical effect will be readily appreciated by those of ordinary skill in the art based on the explanation of the first embodiment, and thus will not be further described herein.

The method for adjusting the trigger mechanism of a garbage collection function described in the second embodiment may be implemented by a computer program. The computer program may be stored in a non-transitory computer readable storage medium. When the codes comprised in the computer program are loaded into an electronic computing device (e.g., the electronic computing device 1 of the first embodiment), the method for adjusting the trigger mechanism of a garbage collection function described in the second embodiment will be executed by the computer program. The non-transitory computer readable storage medium may be an electronic product, such as a read only memory (ROM), a flash memory, a floppy disk, a hard disk, a compact disk (CD), a mobile disk or any other storage media with the same function and well known to those skilled in the art.

According to the technology of the present invention, the system program executed in the electronic computing device uses a whitelist, and the whitelist records an offset value (i.e., an amount for updating a threshold for triggering the garbage collection function) of each application. Each time an application is triggered, the system program determines whether an offset value of the application is contained in the whitelist. If it is contained in the whitelist, the system program updates the threshold value for triggering the garbage collection function accordingly. Since the threshold value for triggering the garbage collection function is dynamically updated by the system program, the probability of triggering the garbage collection function is decreased, the timing of triggering the garbage collection function is postponed, and the execution performance of the application is improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An electronic computing device, comprising:
a storage unit, being configured to store a whitelist, wherein the whitelist records a plurality of data sets, each of the data sets has a name of an application and an offset value of the application for updating a threshold value for triggering a garbage collection function;
a memory; and
a processor, being electronically connected to the storage unit and the memory and executing a system program, wherein the system program loads the whitelist into the memory during an initialization procedure, detects that a specific application starts to be executed, retrieves, in response to the detection that the specific application starts to be executed, the offset value corresponding to the specific application from the whitelist stored in the memory according to a name of the specific application, forks the specific application to derive a process, and updates the threshold value for triggering the garbage collection function according to the offset value corresponding to the specific application.

2. The electronic computing device of claim 1, wherein the system program updates the threshold value by adding the offset value to the threshold value.

3. The electronic computing device of claim 1, wherein the system program further determines that an estimated heap usage amount is greater than the threshold value, and the system program further executes the garbage collection function after determining that the estimated heap usage amount is greater than the threshold value.

4. The electronic computing device of claim 1, wherein the system program is one of a Java virtual machine, an Android Runtime (ART) virtual machine, and a Dalvik virtual machine.

5. A method for adjusting trigger mechanism of a garbage collection function, being applicable to an electronic computing device, the electronic computing device comprising a storage unit, a memory, and a processor, the storage unit storing a whitelist, the whitelist recording a plurality of data sets, each of the data sets having a name of an application and an offset value of the application for updating a threshold value for triggering the garbage collection function, the method comprising the following steps of:
(a) executing a system program by the processor;
(b) loading, by the system program, the whitelist into the memory during an initialization procedure;
(c) detecting, by the system program, that a specific application starts to be executed;
(d) retrieving, by the system program, in response to the detection that the specific application starts to be executed, the offset value corresponding to the specific application from the whitelist stored in the memory according to a name of the specific application;
(e) forking, by the system program, the specific application to derive a process; and
(f) updating, by the system program, the threshold value for triggering the garbage collection function according to the offset value corresponding to the specific application.

6. The method of claim 5, wherein the step (f) updates the threshold value by adding the offset value to the threshold value.

7. The method of claim 5, further comprising the following steps of:
determining, by the system program, that an estimated heap usage amount is greater than the threshold value; and
executing, by the system program, the garbage collection function after determining that the estimated heap usage amount is greater that the threshold value.

8. The method of claim 5, wherein the system program is one of a Java virtual machine, an Android Runtime (ART) virtual machine, and a Dalvik virtual machine.

9. A non-transitory computer readable storage medium, having a computer program stored therein, the computer program executing a method for adjusting trigger mechanism of a garbage collection function after being loaded into an electronic computing device, the electronic computing device comprising a storage unit, a memory, and a processor, the storage unit storing a whitelist, the whitelist recording a plurality of data sets, each of the data sets having a name of an application and an offset value of the application for updating a threshold value for triggering the garbage collection function, the method comprising the following steps of:

(a) executing a system program by the processor;
(b) loading, by the system program, the whitelist into the memory during an initialization procedure;
(c) detecting, by the system program, that a specific application starts to be executed;
(d) retrieving, by the system program, in response to the detection that the specific application starts to be executed, the offset value corresponding to the specific application from the whitelist stored in the memory according to a name of the specific application;
(e) forking, by the system program, the specific application to derive a process; and
(f) updating, by the system program, the threshold value for triggering the garbage collection function according to the offset value corresponding to the specific application.

10. The non-transitory computer readable storage medium of claim 9, wherein the step (f) updates the threshold value by adding the offset value to the threshold value.

11. The non-transitory computer readable storage medium of claim 9, further comprising the following steps of:
determining, by the system program, that an estimated heap usage amount is greater than the threshold value; and
executing, by the system program, the garbage collection function after determining that the estimated heap usage amount is greater that the threshold value.

12. The non-transitory computer readable storage medium of claim 9, wherein the system program is one of a Java virtual machine, an Android Runtime (ART) virtual machine, and a Dalvik virtual machine.

* * * * *